May 15, 1928.  
J. W. WATSON  
FRICTION MEMBER  
Filed July 14, 1923

1,670,224

Inventor  
John Warren Watson,  
by his Attorneys  
Howson & Howson

Patented May 15, 1928.

1,670,224

UNITED STATES PATENT OFFICE.

JOHN WARREN WATSON, OF PHILADELPHIA, PENNSYLVANIA.

FRICTION MEMBER.

Application filed July 14, 1923. Serial No. 651,601.

This invention relates to friction-producing and friction-controlling means for use in connection with brake, clutch or other friction mechanisms, and an object of the invention is to reduce noise-producing and grabbing tendencies in these mechanisms without materially lessening or departing from the running coefficients of friction as are employed in materials customarily used for friction purposes in this type of mechanism.

Another object is to provide a friction material for use in connection with the aforesaid friction mechanisms which will neutralize variations in their coefficients of friction.

Still another object is to provide friction material which is little affected by water or heat.

Figure 1:
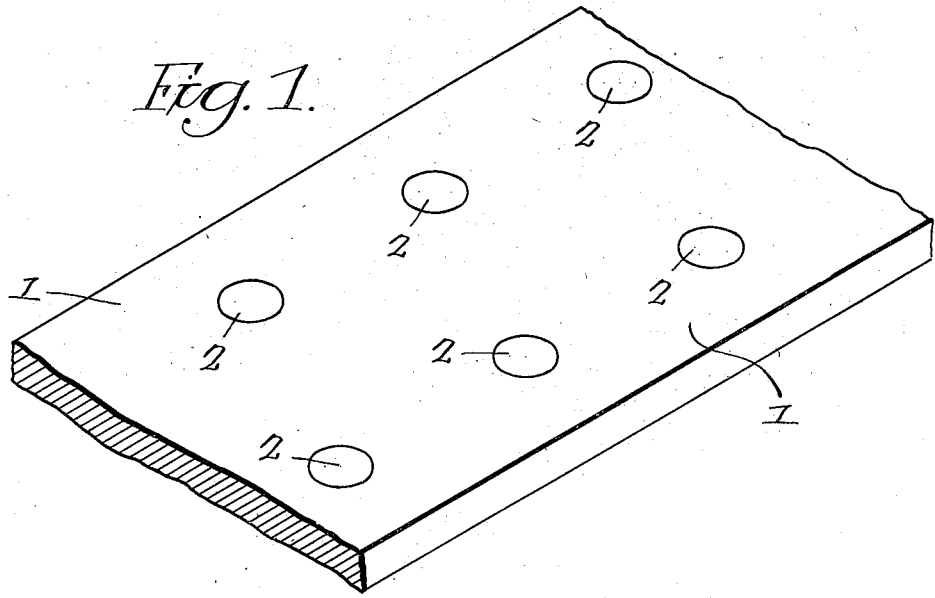
Figure 2:
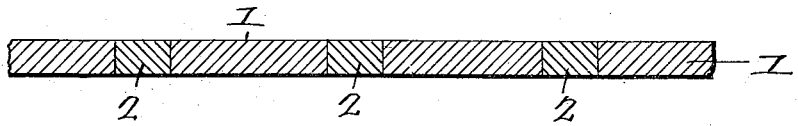

These objects and other advantageous ends I obtain as hereinafter set forth, reference being had to the accompanying drawings, in which Fig. 1 is a fragmentary perspective view of a friction member showing one form of my invention; and, Fig. 2 is a cross section of the member shown in Fig. 1 further illustrating the invention.

In the above drawings, 1 represents a piece of a brake member such as a band of customary brake lining material and in this band I mould or place inserts 2 of material possessing certain friction-controlling qualities designed to accomplish the purposes noted above. This friction producing and friction controlling material may be more intimately combined with the usual brake lining materials by direct impregnation which may be accomplished by first powdering or otherwise reducing the material and then forcing it into the interstices of the brake material by means of pressure rolls or otherwise.

My invention consists of employing, for friction purposes, a composite material comprising, as a base graphite, clay and tallow or other fatty materials—a material such as is found in many writing leads, lumber crayons, etc., and which are commonly on the market and produced by many concerns for writing purposes. In selecting leads or crayons for this new duty, it has been found that better results are obtainable with those of the class of leads which contain no waxy material.

In the present case, as shown in the drawings, inserts 2 are placed in holes or cavities in the brake member 1 and extend perpendicularly to the braking or friction-face thereof so that under conditions of use said face as well as the adjacent surface with which it coacts has imparted to it a coating of the friction material which effectually prevents vibration or chattering of the band such as will ordinarily give rise to a squeaky or other noisy operation. At the same time, this coating causes no appreciable diminution of the frictional braking qualities of the braking material.

The permissible variance in the combination of substances and their proportions is so great, it is to be understood that I do not limit myself to any particular combination or set of proportions, but have described broadly my invention which consists of providing, not a mere lubricant for a brake member, but a friction material which effectually eliminates or minimizes all noise-producing and grabbing tendencies without materially altering or departing from customary running coefficient of friction. As described above, an abundance of such composite materials are readily obtainable on the market in the form of writing leads, lumber crayons, etc., which are compounded of graphites, clays, fats, etc., in various grades and proportions well known to those skilled in the art. A test which can be quickly made to determine the fitness of any particular lead or crayon for the purposes of my invention is to slowly rub the lead back and forth on a pad of paper and with fair pressure, and note whether or not a noise or jump is perceptible at the beginning of each stroke. The less the noise or jump the better is the lead suited to the purpose.

I claim:

1. The combination with a friction member of material therein comprising graphite; a non-lubricating mineral substance for maintaining a satisfactory running coefficient of friction; and a fatty material.

2. The combination with a friction member of material therein comprising graphite; clay; and fatty material.

3. Friction controlling material embodying graphite; a mineral powder; and a fatty material.

4. A non-metallic friction member comprising a fat and non-lubricating matter.

5. A non-metallic friction member comprising a fat and non-lubricating matter mechanically compounded.

6. The combination with a friction member of material therein comprising carbonaceous lubricant, fat, and non-lubricating mineral substance for maintaining a satisfactory running coefficient of friction.

7. In a flexible friction member the combination of a friction producing insert and a fat.

JOHN WARREN WATSON